United States Patent [19]
Doi et al.

[11] Patent Number: 5,703,863
[45] Date of Patent: Dec. 30, 1997

[54] OPTICAL DEVICE WHICH DETECTS REFLECTED LIGHT WITH A PUSH-PULL METHOD WITHOUT DIVIDING THE REFLECTED LIGHT

[75] Inventors: Masato Doi; Hironobu Narui, both of Kanagawa; Takashi Nakao, Saitama, all of Japan

[73] Assignee: Sony Corporation, Tokyo, Japan

[21] Appl. No.: 603,872

[22] Filed: Feb. 22, 1996

[30] Foreign Application Priority Data

Feb. 23, 1995 [JP] Japan .................................. 7-035528

[51] Int. Cl.$^6$ ...................................................... G11B 7/00
[52] U.S. Cl. ........................................ 369/112; 369/44.14
[58] Field of Search ............................... 369/109, 44.32, 369/44.37, 112, 122, 100, 121, 120, 44.12, 44.14

[56] References Cited

U.S. PATENT DOCUMENTS

5,517,479  5/1996  Nakaniski et al. ................ 369/109

Primary Examiner—P. W. Huber

[57] ABSTRACT

An optical device comprises a light-emitting portion (4), a converging means (3), and a light-receiving portion (5), wherein light ($L_F$) emitted from the light-emitting portion (4) is converged and irradiated by the converging means (3) on an irradiated portion (2) and returned light ($L_R$) reflected from the irradiated portion (2) also is converged by the converging means (3), the light-receiving portion (5) is disposed near a confocal position of returned light ($L_R$) from the irradiated portion (2) of the converging means (2), light ($L_F$) emitted from the light-emitting portion (4) is passed through a light path of the same axis and received by the light-receiving portion (5) before and after it is reflected on the irradiated portion (2), and the light-receiving portion (5) detects a signal based on a push-pull method. In the optical device such as an optical pickup, the number of optical components can be reduced, and alignment required to adjust optical components of the optical device for proper interrelationship can be simplified. Thus, the optical device can be simplified and miniaturized. Also, a tracking servo signal can be stably detected by utilizing push-pull method.

6 Claims, 7 Drawing Sheets

OPTICAL DEVICE WHICH DETECTS REFLECTED LIGHT WITH A PUSH-PULL METHOD WITHOUT DIVIDING THE REFLECTED LIGHT

BACKGROUND OF THE INVENTION

The present invention relates to an optical device for use in receiving and detecting returned light reflected on an optical recording medium such as an optical disk or a magnetooptical disk at its portion irradiated with light from a light-emitting portion.

Heretofore, in optical devices such as an optical disk drive for a compact disc (CD) or an optical pickup for a magnetooptical disk drive, optical components such as a grating or a beam splitter are fabricated individually, and hence the optical device can become a large and complicated arrangement. Moreover, when such optical components are fabricated on a base of an optical device as hybrid chips, they have to be optically positioned with extremely high alignment accuracy.

Figure 1:
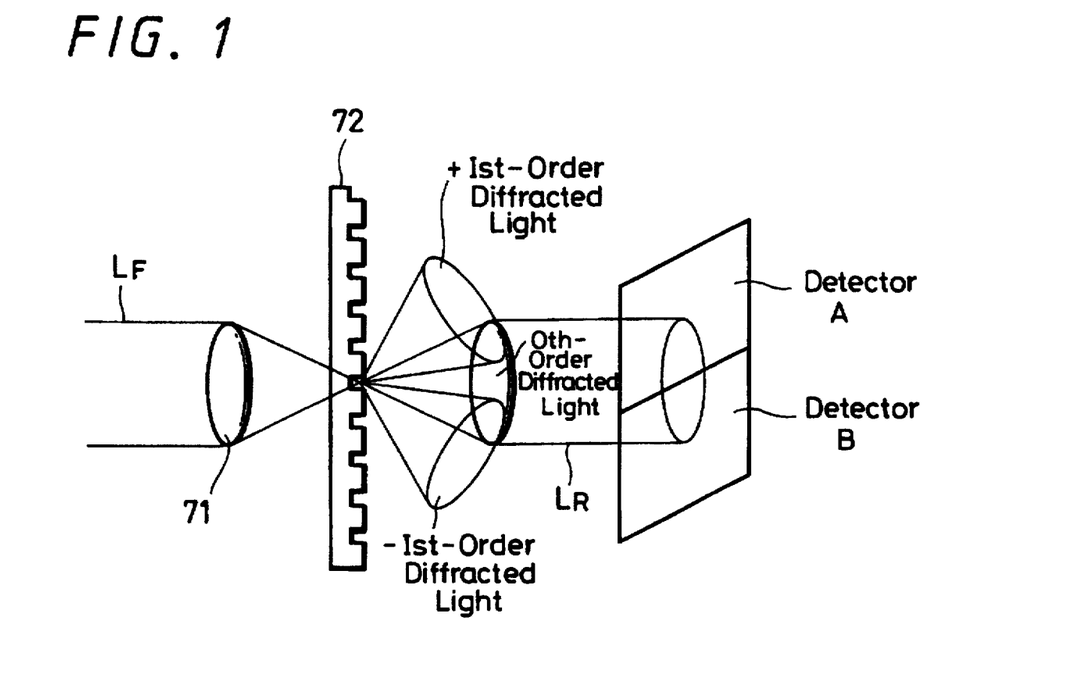
FIG. 1 is a schematic diagram showing reflection and diffraction of light in an optical pickup system.

FIG. 1 of the accompanying drawings schematically shows a light path of incident light and a light path of reflected light with respect to a reflection point on a recording medium, e.g., optical disk. As shown in FIG. 1, according to an optical pickup 70 now commercially available, incident light $L_F$ converged by an objective lens 71 is introduced into an optical recording medium, e.g., optical disk 71 at its recording pit, whereat it is reflected and diffracted to three beam spots of zero-order diffracted light, + first-order diffracted light, and − first-order diffracted light, thereby forming reflected light $L_R$. Beams of diffracted light interfere with each other to change intensity of light of far field pattern formed by the reflected-back light $L_R$ returned from the optical disk 72, and the optical pickup 70 reproduces a signal recorded on the optical disk 72 by use of the change of intensity of light.

When a beam spot of light incident on the optical disk is shifted from a track or a pit, the + first-order diffracted light and the − first-order diffracted light have a difference of intensity produced therebetween to produce an asymmetric far field pattern. A push-pull method, which is one of well-known tracking servo methods, uses the above phenomenon, generates signals corresponding to the asymmetric far field patterns by two detectors A and B, and detects an offset of a beam spot by calculating these signals with a calculator (not shown).

Figure 2:
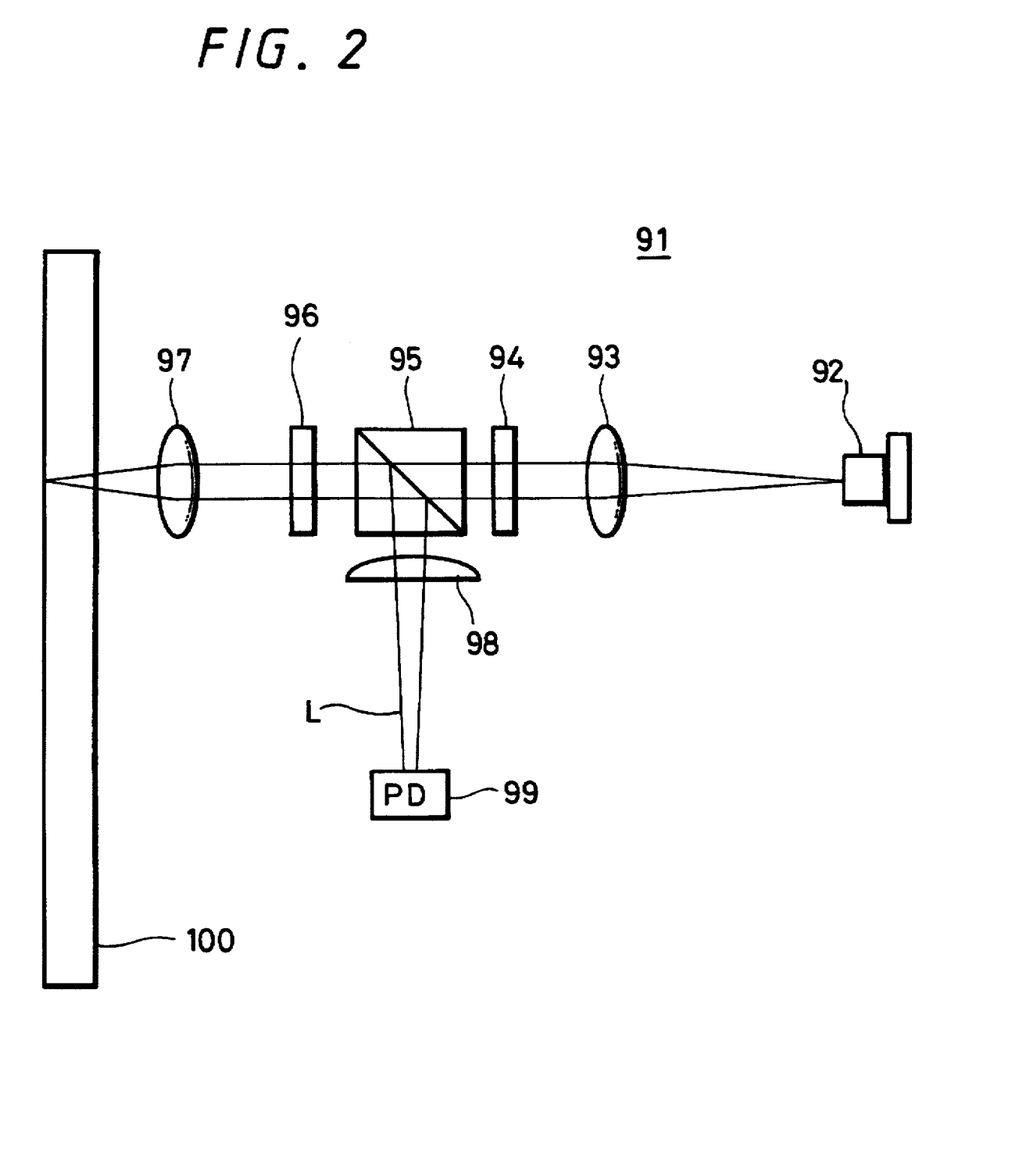
FIG. 2 is a schematic diagram showing an optical system of an optical pickup.

FIG. 2 schematically shows an example of an optical pickup. As shown in FIG. 2, an optical pickup 91 comprises a semiconductor laser 92, a collimator lens 93, a grating 94, a polarizing beam splitter 95, a quarter-wave plate 96, a focusing lens 97, a cylindrical lens 98, and a light-receiving element 99 composed of a photodiode (PD). Laser beam L emitted from the semiconductor laser 92 is caused by travel through the collimator lens 93, the grating 94, the polarizing beam splitter 95, the quarter-wave plate 96, and the focusing lens 97 and irradiated on an optical lens 100. Returned light reflected on the optical disk 100 is reflected by the polarizing beam splitter 95, and received by the light-receiving element 99 through the cylindrical lens 98.

When the optical device detects the tracking servo signal based on the push-pull method, optical components have to be assembled with high positional accuracy, and a margin against the lateral movement of lens or radial skew of optical disk is reduced.

In the optical pickup, optical components are fabricated individually, and sizes of optical components are large, requiring high alignment accuracy.

When light is returned to a light-emitting portion and returned light is detected, light has to be divided by a beam splitter or a hologram, and therefore an amount of light received at a light-receiving portion is decreased.

SUMMARY OF THE INVENTION

In view of the aforesaid aspect, it is an object of the present invention to provide an optical device, such as an optical pickup, in which the number of assemblies can be reduced, and alignment required to adjust optical components of the optical device for proper interrelationship can be simplified.

It is another object of the present invention to provide an optical device which can be simplified and miniaturized in arrangement.

It is still another object of the present invention to provide an optical device which can be manufactured with ease.

It is a further object of the present invention to provide an optical device which can reduce a power consumption by increasing a ratio of light returned to a light-receiving portion.

It is still a further object of the present invention to provide an optical device in which a signal can be reliably detected by a push-pull method with highly-accurate alignment, thus enabling a stable tracking servo to be carried out.

According to an aspect of the present invention, there is provided an optical device which is comprised of a light-emitting portion (or light emitter), a converging means, and a light-receiving portion (or light receptor), wherein light emitted from the light-emitting portion is converged and irradiated by the converging means on to an irradiated portion and returned light from the irradiated portion is converged by the converging means, the light-receiving portion is disposed near a confocal of the converging means with respect to the returned light from the irradiating means, light emitted from the light-emitting portion is passed through a light path of the same axis and received by the light-receiving portion before and after it is reflected on the irradiated portion, and the light-receiving portion detects a signal based on a push-pull method.

According to another aspect of the present invention, there is provided an optical device which is comprised of a light-emitting portion composed of a horizontal resonator type laser, and a reflection portion disposed in confronting one exit end face of the laser, and a light-receiving portion formed on the reflection portion, wherein the light-receiving portion is disposed near a confocal position of returned light from the laser, and the light-receiving portion detects a signal based on a push-pull method.

In accordance with the above arrangement, when the light-receiving portion detects a signal by the push-pull method, light incident on the irradiated portion, i.e., the position which the light emitted from the light-emitting portion irradiates the irradiated portion can be detected.

DETAILED DESCRIPTION OF THE PRESENTLY PREFERRED EMBODIMENTS

Prior to describing an optical device according to the present invention, a manner in which a tracking servo signal is detected by an optical system, i.e., a confocal optical system used when the optical device according to the present invention is applied to an optical system for reading a recorded signal from a recording medium, e.g., an optical disk, will be described below.

Figure 3:
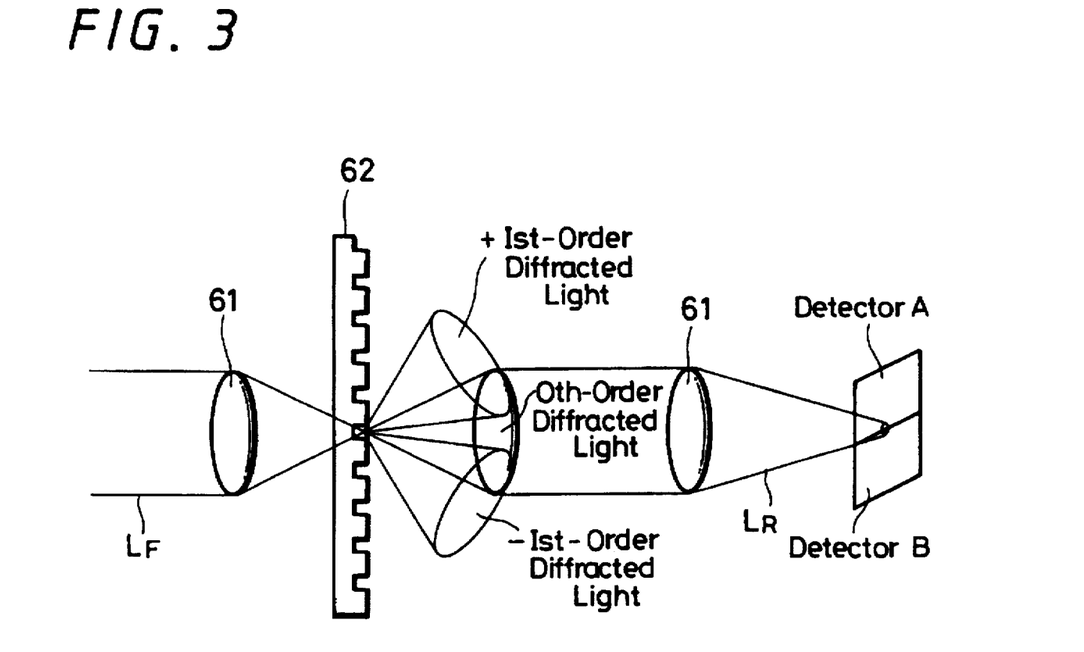
FIG. 3 is a schematic diagram showing reflection and diffraction of light in an optical pickup system according to the present invention.

FIG. 3 schematically shows a light path of incident light and a light path of reflected light with respect to a reflection point on a recording medium, e.g., an optical disk. As shown in FIG. 3, in an optical pickup 60 according to the present invention, incident light $L_F$ converged by an objective lens 61 is introduced into an optical recording medium, e.g., optical disk 62 at its recording pit, whereat it is reflected and diffracted to produce three beam spots of zero-order diffracted light, + first-order diffracted light, and − first-order diffracted light, thereby producing reflected light $L_R$ similarly to FIG. 1. Beams of diffracted light interfere with each other to change intensity of light of a far field pattern produced by the reflected light $L_R$ returned from the optical disk 62.

According to the present invention, the optical pickup includes a plurality of detectors, e.g., the detectors A, B similarly to FIG. 1, and the detectors A, B are located at a position at which the reflected light $L_R$ is converged and focused by converging means such as an objective lens 61, i.e., near a confocal as shown in FIG. 3, thus forming a confocal optical system.

At that time, the spot diameter of the reflected light $L_R$ irradiated on the detectors A, B is reduced and the beam spot becomes small compared with the case shown in FIG. 1, and hence the tracking servo signal can be detected by smaller detectors.

The optical pickup according to the present invention detects the tracking servo signal based on the push-pull method, and the manner in which the tracking servo signal is detected by the push-pull method will be described.

The push-pull method is able to detect the tracking servo signal by calculating light reflected and diffracted on the irradiated portion on the optical disk at its tracking guide groove as an output difference between two light-receiving portions symmetrically positioned on a binary photodiode PD.

Figures 4A, 4B:
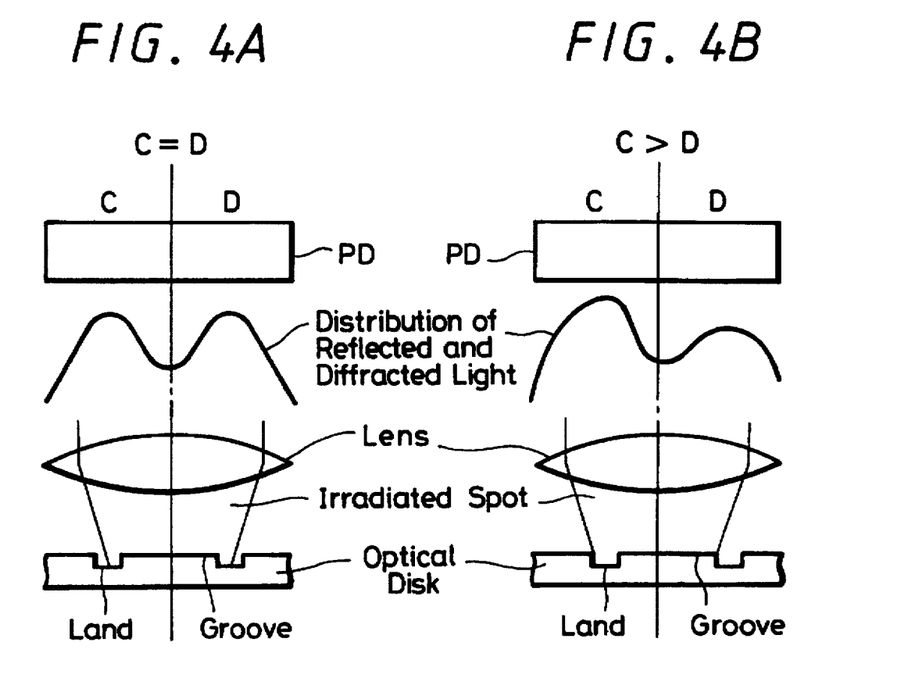
FIGS. 4A and 4B are schematic diagrams showing a relationship between irradiated position of beam spot on the optical disk and a distribution of reflected and diffracted light.

FIGS. 4A and 4B schematically show a relationship between a position of a beam spot irradiated on the optical disk and a distribution of reflected and diffracted light. When the center of the irradiated beam spot and the center of the guide groove (groove portion), as shown in FIG. 4A, there can be obtained a symmetric distribution of reflected and diffracted light, and intensities of beams sensed by two photodiodes PD (C, D) are agreed with each other. In case the center of the irradiated beam spot, the guide groove, and an intermediate portion (land portion) are agreed, there can be obtained a symmetric distribution of reflected and diffracted light similarly to FIG. 4A, and intensities of beams received by the two photodiodes PD are agreed with each other. When on the other hand the center of the irradiated beam spot is not agreed with the center of the groove portion or the land portion, there is obtained an asymmetric distribution of diffracted light, and hence intensities of beams received by the two photodiodes PD are not agreed with each other.

Figure 4C:
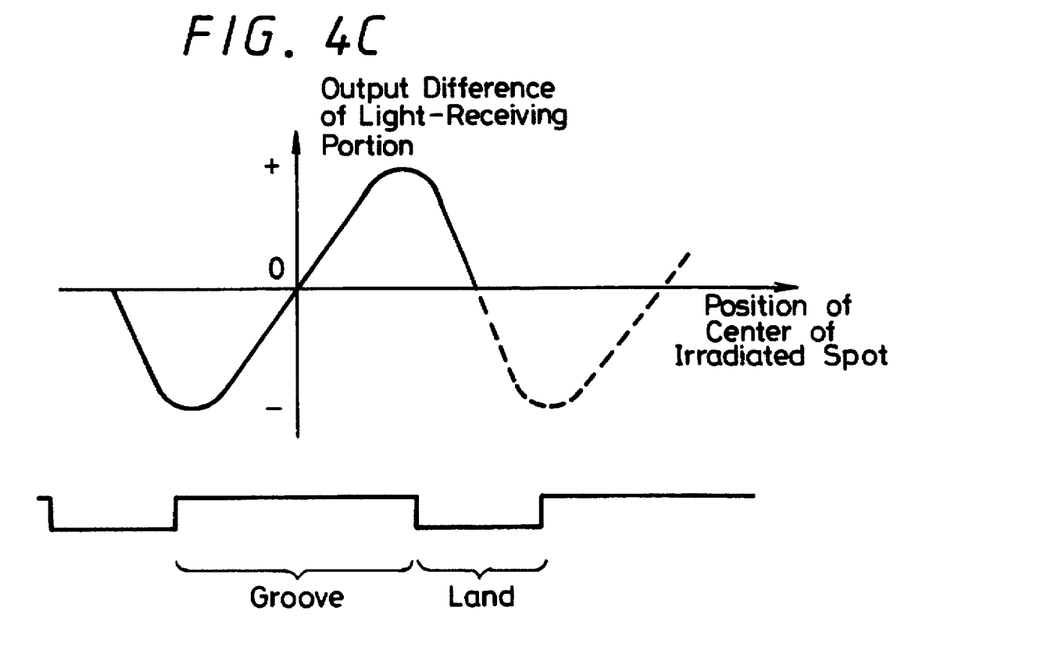
FIG. 4C is a graph showing a relationship between the position of the center of irradiated beam spot and the output power difference of the light-receiving portion.

FIG. 4C is a characteristic graph showing a relationship between the position of the center of the irradiated beam spot and the output difference of the light-receiving portions. As shown in FIG. 4C, a difference between outputs outputted from the two light-receiving portions when the irradiated beam spot crosses the track becomes a sigmoid curve.

Figure 5:
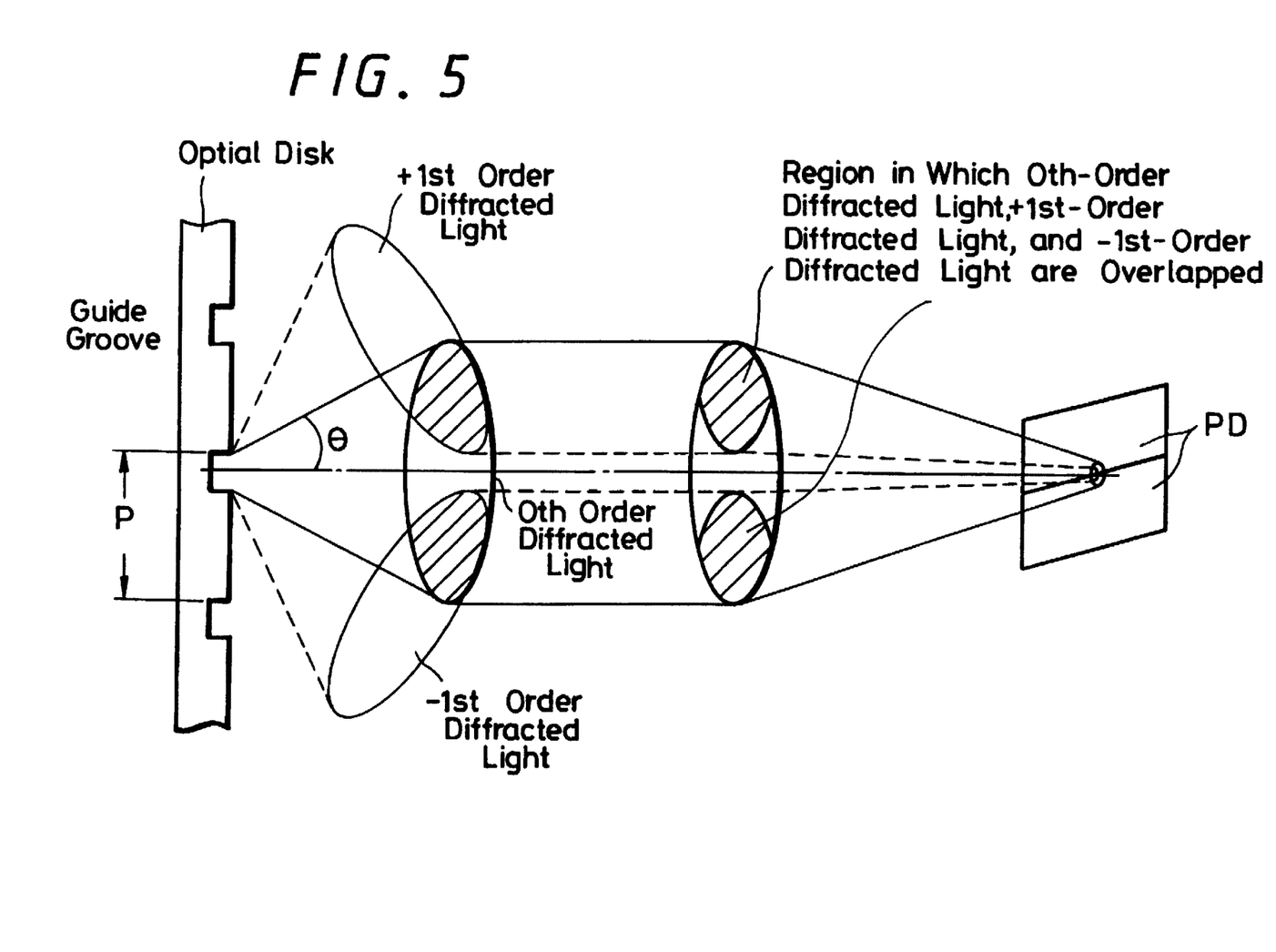
FIG. 5 is a schematic diagram showing light reflected and diffracted on the optical disk.

The manner in which the tracking servo signal is detected according to the push-pull method as described above will be described more fully below with reference to FIG. 5. FIG. 5 is a schematic diagram of reflected and diffracted light from the optical disk. When a track pitch P becomes the same as the size of the beam spot, the guide groove looks like the diffraction grating. Specifically, at that time, phase of light beams are overlapped in the direction satisfying Psin θ=Nλ (N is an integer), and hence an intensity of light is increased. In other words, 1 in the area in which zero-order diffracted light, the + first-order diffracted light and − first-order diffracted light are overlapped to each other, the intensity distribution of the beam spot is changed due to an interference effect achieved by a displacement of track. Therefore, if the detector comprising the binary photodiode PD is disposed in the above area to detect a difference between these outputs, then the tracking servo signal can be detected. At that time, a strength of the tracking servo signal becomes largest when the depth of the guide groove is λ/8n, and when the depth of the guide groove is λ/4n, light beams of diffracted light, which interfere with each other, are canceled each other out, thereby the strength of the tracking servo signal becomes zero.

Subsequently, an optical device according to the present invention will be described with reference to the drawings.

Inventive example 1

Figure 6:
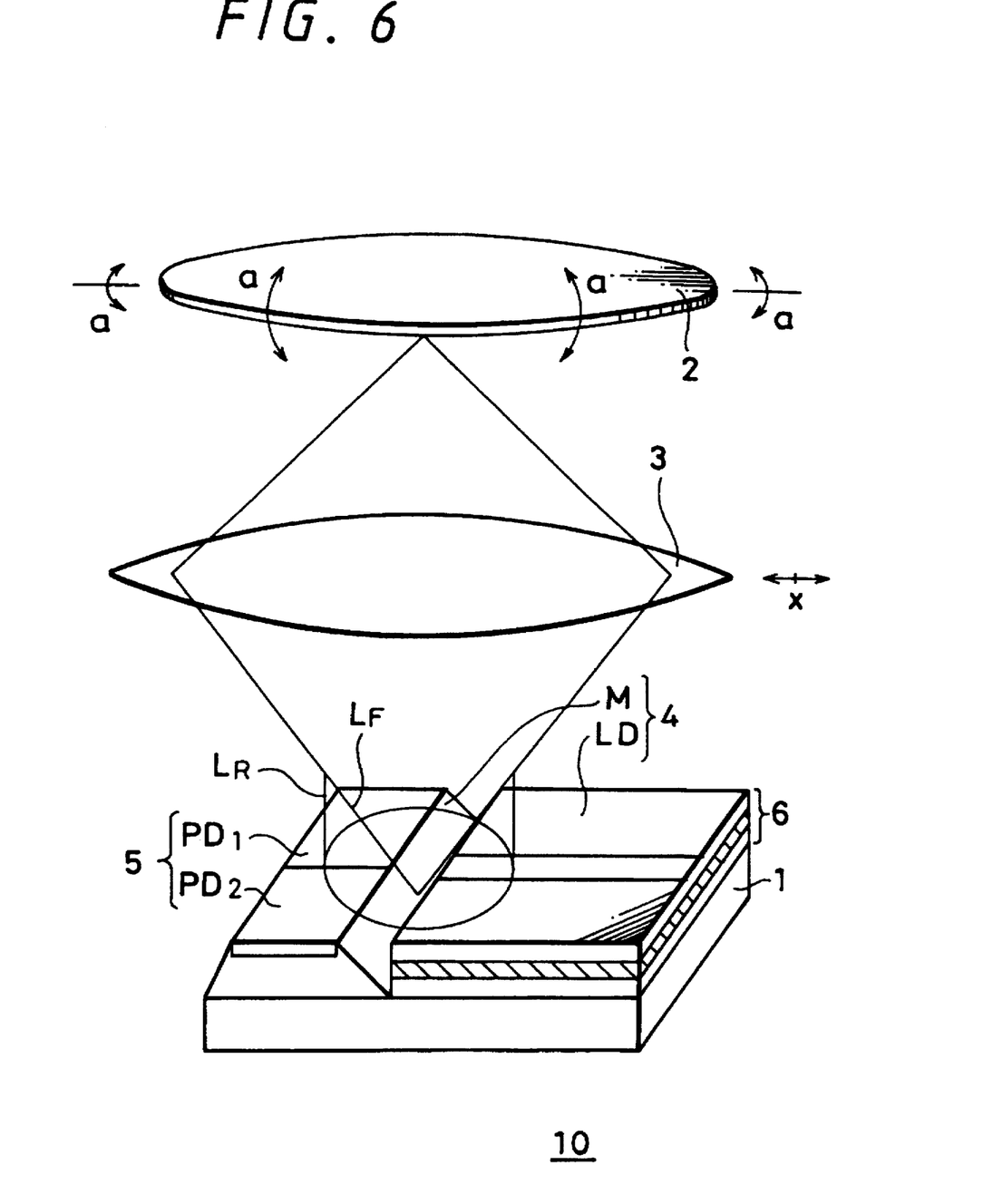
FIG. 6 is a schematic perspective view showing an optical device according to an embodiment of the present invention.

FIG. 6 is a fragmentary perspective view schematically illustrating an optical device according to the present invention. In this inventive example 1, a recording medium is an optical disk with an irradiated portion 2 having recording pits, and the optical device according to the present invention is applied to an optical pickup for reading out a recorded signal by irradiating laser beams on this optical disk.

As shown in FIG. 6, the optical device includes an optical element 10 comprising a semiconductor substrate 1, a light-emitting portion 4 composed of a semiconductor laser LD with its cavity length direction extended along the substrate surface of the semiconductor substrate 1 and a reflecting mirror M disposed on one exit end face of the semiconductor laser LD, a converging means 3 composed of optical components such as a lens, and a light-receiving portion 5 composed of two photodiodes PD ($PD_1$, $PD_2$), and light emitted from the light-emitting portion 4 is converged and irradiated by the converging means 3 on the irradiated portion 2 of the optical disk or the like. Returned light $L_R$ reflected from the irradiated portion 2 is converged by the common converging means 3, and returned to the optical element 10. The light-receiving portion 5 in the optical element 10, i.e., the photodiodes $PD_1$, $PD_2$ are disposed in the semiconductor substrate 1 on its opposite side of the semiconductor laser LD near the confocal across the reflecting mirror M.

The returned light $L_R$ is converged by the converging means 3 up to substantially a light diffraction limit (i.e., diffraction limit of lens), and the light-receiving portion 5 is disposed such that at least a part of light-receiving surface of each of the photodiodes $PD_1$, $PD_2$ lies within this light diffraction limit, i.e., a distance of light emitted from the light-emitting portion 4 crossing the reference plane for disposing the light-receiving surface from its optical axis becomes 1.22λ/NA where λ represents a wavelength of light emitted from the light-emitting portion 4, and NA represents a numerical aperture of the converging means 3.

Also, a diameter of light $L_F$ received on the light-receiving surface of the light-receiving portion 5 from the light-emitting portion 4 is made smaller than a diameter of the light diffraction limit, and an effective light-receiving surface of the light-receiving portion 5 is positioned out of the diameter of the emitted light $L_F$. If the light-emitting portion 4 uses a semiconductor laser as its light source, then light emitted from such light-emitting portion 4 has a diameter of about 1 to 2 μm. If the converging means 3 has the numerical aperture NA of about 0.09 to 0.1 and emitted light has the wavelength λ of about 780 nm, then the diffraction limit becomes about 1.22λ/NA=10 μm.

A manner in which the optical element 10 is manufactured by selective MOCVD (metal organic chemical vapor deposition) will be described.

Semiconductor layers comprising the semiconductor laser LD are epitaxially deposited on the first conductivity type semiconductor substrate 1. Specifically, although not shown, on the semiconductor substrate 1 is formed a laminated semiconductor layer 6 on which a first cladding layer of the same conductivity type as that of the semiconductor substrate 1, an active layer, and a second cladding layer of a second conductivity type different from that of the first cladding layer are sequentially epitaxially deposited by a suitable method such as MOCVD.

Then, the laminated semiconductor layer 6 is etched away by RIE (reactive ion etching) at its portion where at least the reflecting mirror M and the photodiodes PD are finally formed while a part of the semiconductor layers comprising the laminated semiconductor layer 6 is left as the semiconductor laser LD. Etched surfaces, i.e., two facets of the laminated semiconductor layer 6 are resonator facets, and a horizontal resonator of the semiconductor laser LD is fabricated between the two facets. In this case, current-blocking regions are formed across the region in which the horizontal resonator of the semiconductor laser LD is finally formed by implanting ions of impurity.

Then, a mask layer of an insulating layer for selective MOCVD is deposited on the semiconductor substrate 1 so as to mask the semiconductor layer 6 left on the semiconductor substrate 1, i.e., the portion in which the semiconductor laser LD is formed.

A first semiconductor layer of a first conductivity type, for example, is deposited on the semiconductor substrate 1 at its portion, which is not masked by the mask layer, by selective MOCVD, and a second semiconductor layer of a second conductivity type is selectively deposited on the upper surface of the first semiconductor layer by diffusing impurities. The first and second semiconductor layers comprise the photodiodes PD ($PD_1$, $PD_2$) composing the light-receiving portion 5.

In that case, when the first semiconductor layer is selectively epitaxially deposited, the reflecting mirror M is produced as a specific crystal plane, and formed as an inclined plane of an atomic surface with excellent morphology. Therefore, the reflecting mirror M has an inclination of a predetermined angle between it and the surface of the semiconductor substrate 1. This crystal plane is formed as a specific crystal plane by selecting the upper surface of the semiconductor substrate 1 and the direction of the horizontal resonator of the semiconductor laser LD.

The optical element 10 may be manufactured by other methods. That is, after the laminated semiconductor layer 6 has been formed on the semiconductor substrate 1, a groove with one surface formed as a vertical plane and the other surface formed as an inclined plane is formed by a suitable method such as RIE. This vertical plane is used as one facet of the horizontal resonator of the semiconductor laser LD. Moreover, after the groove has been formed, the reflecting mirror M of a metal film of a dielectric multilayer film is formed on the inclined plane.

In the optical device thus arranged so far, light emitted from the semiconductor laser LD is reflected by the reflecting mirror M, and becomes light $L_F$ emitted from the light-emitting portion 4. The light $L_F$ is converged by the converging means 3, irradiated on the irradiated portion 2 of the optical disk, and reflected and diffracted on the recording pits formed on the irradiated portion 2 of the optical disk in the same manner as that of the example shown in FIG. 3. Then, reflected and diffracted light travels through a light path of the same axis of the emitted light $L_F$ which is not reflected yet. Returned light $L_R$ from the irradiated portion 2 has a beam spot with a diameter determined by diffraction limit, and received by the light-receiving portion 5 formed around the light-emitting portion 4. The photodiodes PD ($PD_1$, $PD_2$) of the light-receiving portion 5 are disposed on the semiconductor substrate 1 at its position near the semiconductor laser LD, e.g., on the semiconductor substrate 1 at its side in which the reflecting mirror M is disposed. In this case, the photodiodes $PD_1$, $PD_2$ are lying within the position of the beam spot with the diameter determined by the diffraction limit.

Signals generated from the two photodiodes $PD_1$, $PD_2$ when the photodiodes $PD_1$, $PD_2$ are irradiated with the returned light $L_R$ are calculated, and a tracking servo signal is detected by the push-pull method. Also, recorded information is read out from the optical disk, i.e., an RF signal is detected from the optical disk by the whole of the photodiodes $PD_1$, $PD_2$.

The optical device having the optical element 10 in which the light-emitting portion 4 and the light-receiving portion 5 are formed on the one semiconductor substrate 1 as shown in FIG. 6 and the optical device in which the semiconductor laser 82 of the light-emitting portion and the light-receiving element 99 of the light-receiving portion are separately disposed as shown in FIG. 2 are compared with each other, i.e., amounts of offset generated (offset from a correct tracking servo signal) in the tracking servo signals from the above two optical devices when the lens position is offset or the optical disk is curved or skewed are compared with each other.

Figure 7:
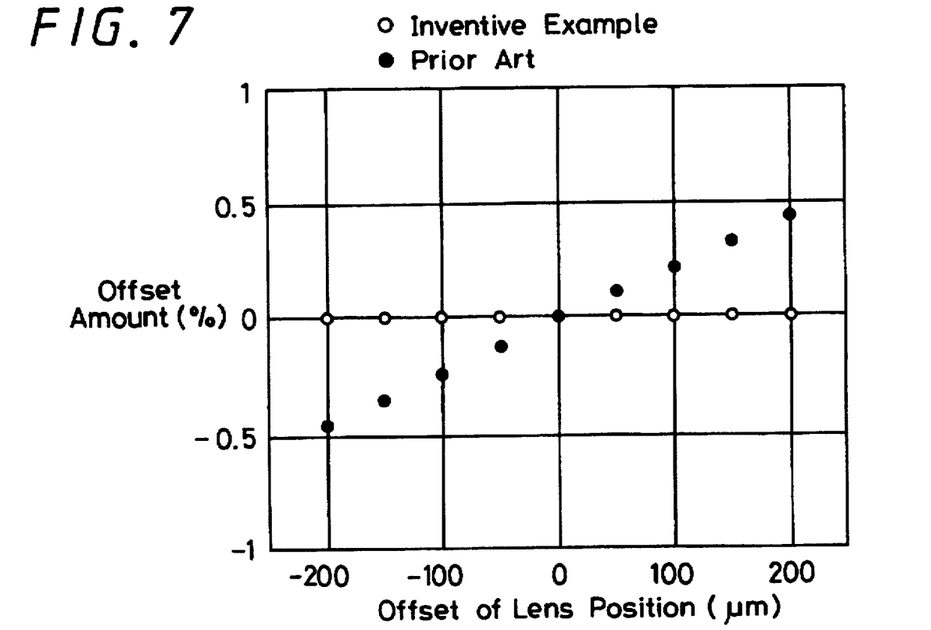
FIG. 7 is a graph showing a relationship between offset of lens position and offset amount of tracing servo signal.

Initially, amounts of offset generated in the tracking servo signals that have been calculated from the detector comprising the two photodiodes $PD_1$, $PD_2$ by a push-pull method when the lens, i.e., the converging means 3 is offset in the lateral direction, i.e., in the direction shown by an arrow "x" in FIG. 6 were compared. FIG. 7 is a graph showing measured results obtained by such comparison.

In FIG. 7, a horizontal axis represents a ratio (%) of offset observed in the tracking servo signal relative to the correct tracking servo signal calculated by the push-pull method, and a horizontal axis represents an offset amount (μm) of lens position. Open circles in FIG. 7 indicate measured results of offset in the tracking servo signal of the optical device according to the inventive example 1, and solid circles indicate measured results of offset in the tracking servo signal of the optical device according to the prior art.

A study of FIG. 7 shows that the amount of offset generated in the tracking servo signal from the optical device according to the inventive example 1 when the lens position was offset 200 μm was zero while the amount of offset generated in the tracking servo signal from the conventional optical device when the lens position was offset 100 μm.

Figure 8:
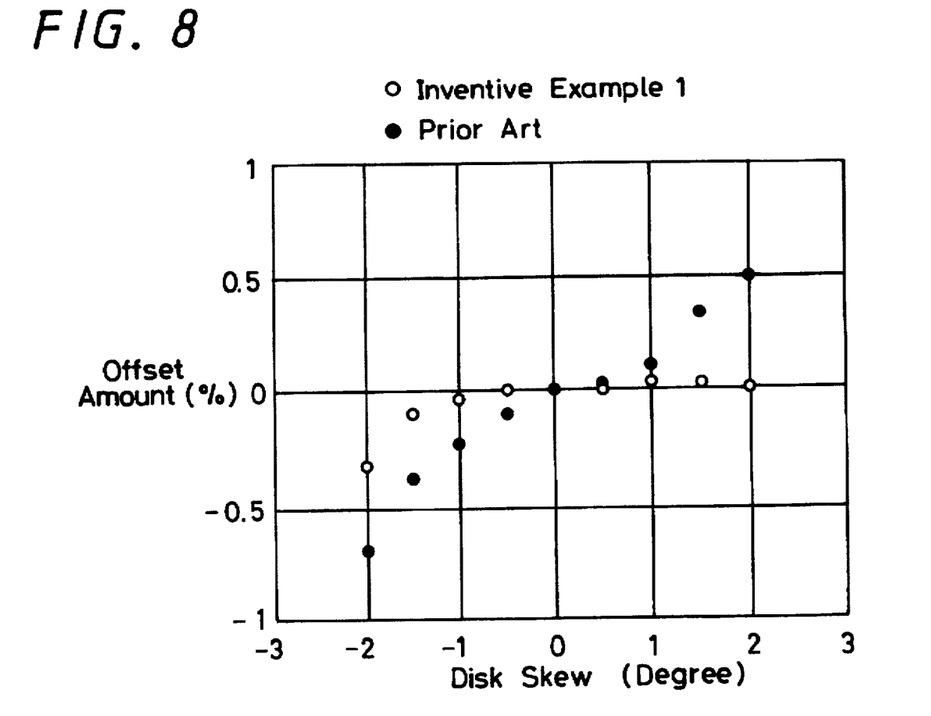
FIG. 8 is a graph showing a relationship between disk skew and offset amount of tracking servo signal.

Further, when the optical disk is skewed as described above, offset is generated in the tracking servo signal. Amounts of offset generated in the tracking servo signals calculated by the push-pull method from the conventional optical device and the inventive optical device when the optical disk is skewed forward or backward about a rotary axis of line passing the center of the optical disk as shown by an arrow "a" in FIG. 6 were compared with each other. FIG. 8 is a graph showing measured results obtained by such comparison.

In FIG. 8, a horizontal axis indicates an inclination (degrees) of the optical disk with respect to the horizontal direction, and a vertical axis indicates a ratio (%) of offset observed in the tracking servo signal relative to the correct tracking servo signal calculated by the push-pull method. Open circles in FIG. 8 indicate measured results of offset in the tracking servo signal of the optical device according to the inventive example 1, and solid circles indicate measured results of offset in the tracking servo signal of the optical device according to the prior art.

It is to be understood from FIG. 8 that the amount of offset generated in the tracking servo signal from the inventive optical device is considerably small compared with that of the conventional optical device, and has an increased margin against the radial skew of optical disk.

As described above, the optical device according to the inventive example 1 can increase a margin against offset of lens position and the curving or radial skew of the optical disk compared with the conventional optical disk. Therefore, the optical device according to the inventive example 1 can stably accurately detect a variety of signals, such as the tracking servo signal or the RF signal which results from reading recorded information from the optical disk.

According to the present invention, the light-emitting portion and the light-receiving portion are fabricated on one semiconductor, and hence the whole of the optical pickup can be reduced in scale.

Further, the returned light from the irradiated portion travels through the same light path as that of the emitted light. Therefore, alignment of optical components can be adjusted with ease, and a ratio of light which will be returned to the light-emitting portion can be increased.

Furthermore, the optical device according to the present invention can increase the margin against the offset of lens position and the curving or skew of the optical disk, and stably detect the tracking servo signal.

The optical device according to the inventive example 1 has single light-emitting portion and single light-receiving portion fabricated on the one semiconductor substrate. However, the principle of the present invention can be similarly applied to such a variant that a plurality of light-emitting portions and light-receiving portions are fabricated on one semiconductor substrate.

Inventive example 2

Figure 9:
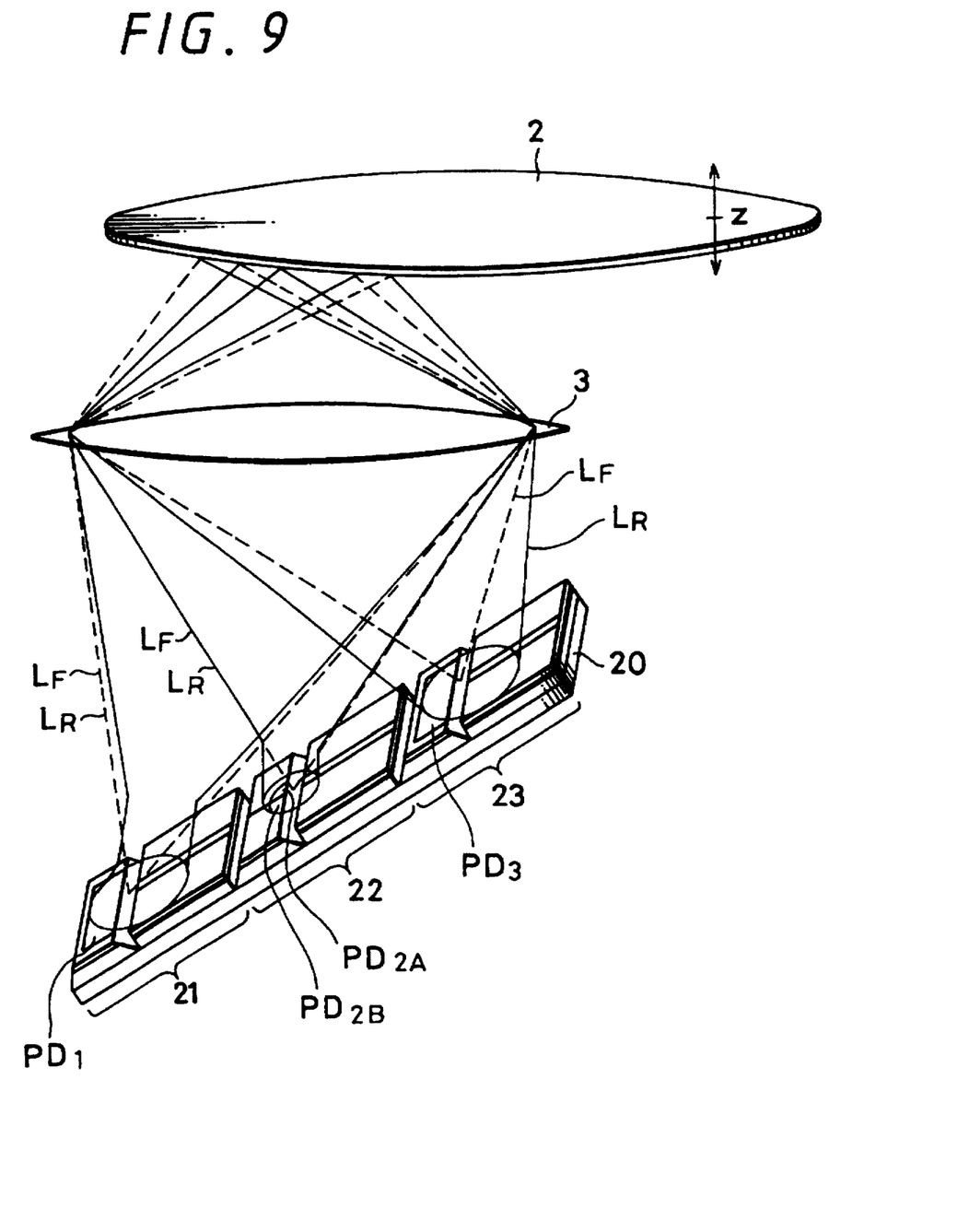
FIG. 9 is a schematic perspective view showing an optical device according to another embodiment of the present invention.

FIG. 9 shows an optical device according to other embodiment of the present invention.

As shown in FIG. 9, three optical elements 21, 22, 23 each having a light-emitting portion comprising a semiconductor laser LD and a reflecting mirror M and a light-receiving portion comprising photodiodes PD are formed on one semiconductor substrate 20.

As the photodiodes PD composing the light-receiving portion, the optical element 21 includes a photodiode $PD_1$, the optical element 22 includes two photodiodes $PD_{2A}$, $PD_{2B}$, and the optical element 23 includes a photodiode $PD_3$.

The optical element 22 located at the center of the light-receiving portion is in the form of two components obtained by equally dividing the photodiode PD half for detecting a tracking servo signal based on the push-pull method, and also used to detect the RF signal.

The optical elements 21, 23 located at respective ends of the light-receiving portion are used to detect a focus servo signal based on a so-called distance-difference method.

The optical elements 21, 22, 23 are manufactured in the same manner as to manufacture the optical element 10 of the optical device according to the inventive example 1. Specifically, the laminated semiconductor layer with semiconductor layers sequentially formed thereon for comprising the light-emitting portion, the reflecting mirror M and the first and second semiconductor layers comprising the photodiodes PD of the light-receiving portion are formed on the semiconductor substrate 20, although not shown.

Laser beams $L_F$ (shown by broken lines in FIG. 9) emitted from the respective light-emitting portions are converged by the converging means 3 composed of lens or the like and irradiated on the irradiated portion 2 of the optical disk or the like. At that time, as shown in FIG. 9, laser beams $L_F$ are irradiated on the irradiated portion 2 at its three positions. Laser beams thus irradiated so far are reflected on the irradiated portion 2 and become returned laser beams $L_R$ (shown by fine lines in FIG. 9).

The returned laser beams $L_R$ are returned to the optical elements 21, 22, 23 through the light paths each with the same optical axis as that of each of emitted laser beams $L_F$, and introduced into the light-receiving portion. A light path of laser beam $L_F$ emitted from the central optical element 22 and a light path of returned laser beam $L_R$ returned to the central optical element 22 become substantially equal to each other.

At that time, in the central optical element 22, the light-receiving portion is located near the confocal of the returned laser beam $L_R$ from the irradiated portion 2.

Further, the central optical element 22 can detect a tracking servo signal by calculating signals detected by its two photodiodes $PD_{2A}$, $PD_{2B}$ according to the push-pull method.

The optical elements 21, 23 at the respective ends can detect a focus servo signal based on the distance-difference method. The focus servo signal, i.e., a manner in which laser beams are focused on the irradiated portion 2, composed of the optical recording medium such as the optical disk, of the central optical element 22 can be detected by detecting amounts of light received at the optical elements 21, 23 disposed at the respective ends, i.e., a difference between the outputs from the photodiodes $PD_1$, $PD_3$ of the light-receiving portion.

Specifically, the optical elements 21, 23 disposed at the respective ends are assumed to have the same light-receiving area for receiving returned light $L_R$, i.e., the same light receiving amount, i.e., the same detected output when emitted light $L_R$ from the central optical element 22 is properly focused on the irradiated portion 2. With the above arrangement, when the light $L_F$ emitted from the central optical element 22 is not properly focused on the irradiated portion 2, one beam spot of returned light $L_R$ focused on the effective light-receiving area from one optical element 21 becomes large and another beam spot of returned light $L_R$ focused on the effective light-receiving area from another optical element 23 becomes small and vice versa. In other words, intensities of detected outputs from the light-receiving portions of the optical elements 21, 23 are changed reciprocally.

The manner in which the light $L_F$ emitted from the central optical element 22 is focused on the irradiated portion 2 can be detected by detecting the difference between the detected outputs, and the detected signal can be used as the focus servo signal.

In the optical device shown in FIG. 9, when the semiconductor substrate 20 with the optical elements formed thereon is inclined relative to the irradiated portion 2 and the converging means 3, the returned light $L_R$ is introduced with an inclination into the light-receiving surface of the photodiode. Therefore, the light-receiving area and the amount of received light can be increased by increasing the diameter of the beam spot, thus enabling the photodiodes $PD_1$, $PD_3$ on the optical elements 21, 22 disposed at the respective ends to detect the focus servo signal more accurately.

In the optical device according to the inventive example 2, since the light-emitting portion and the light-receiving portion are formed on one semiconductor substrate and the light-receiving portion is formed near the confocal of the returned light from the irradiated portion similarly to the optical device according to the inventive example 1, the optical pickup can be reduced in scale, alignment of optical components can be simplified, and the tracking servo signal can be detected stably, i.e., similar effects to those of the inventive example 1 can be achieved.

In the optical device according to the present invention, the optical elements disposed at the respective ends can detect the focus servo signal, and the semiconductor substrate is inclined, thus enabling returned light to be introduced into the light-receiving surface with an inclination. Therefore, the amount of received light can be increased, and hence the focus servo signal can be detected stably accurately.

Further, since the distribution of intensity of light can be detected by a plurality of light-receiving portions, a signal has an increased information amount, and various signals can be detected.

As described above, according to the present invention, since the light-receiving portion is disposed near the confocal of light returned to the light-emitting portion and the light-emitting portion and the light-receiving portion are formed on one substrate, the size of the whole of the optical pickup can be reduced, and the number of optical components can be lessened, thereby enabling the optical device to be miniaturized.

Emitted light and returned light travel through the light path of the same optical axis, and hence the optical system can be simplified. In addition, positioning adjustment can be simplified. Moreover, a ratio of light returned to the light-receiving portion can be increased compared with the case that light path is divided by a beam splitter or the like, and hence an amount of received light can be increased.

Therefore, the same amount of received light can be realized by lower laser power, and a power consumption of the optical device can be decreased.

Further, since light is received near the confocal of returned light, a signal can be detected stably and accurately by a push-pull method compared with the case that a signal is detected based on the far field pattern. Therefore, a tracking servo signal can be detected stably. At that time, if a plurality of light-receiving portions are provided to divide returned light, then a variety of signals such as focus servo signal can be detected, and information amount of signal can be increased.

Furthermore, when the present invention is applied to an optical device using an optical disk, a phase-change optical disk or a magnetooptical disk as an optical recording medium, a power consumption of the optical device can be lessened, the optical device can be miniaturized, and a signal can be detected, i.e., reproduced or recorded stably. Therefore, it is possible to realize a highly-efficient optical device.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical device configured to irradiate a medium with light and to receive reflected light returned from the medium, comprising:

a light-emitter which emits the light;

a light receptor configured to receive the reflected light returned from the medium; and converging means for converging the light emitted by the light emitter onto an irradiated portion of the medium, the converging means converging the returned light onto the light receptor, wherein the light receptor receives the returned light undivided and detects a position of the irradiated portion using a push-pull method.

2. In an optical device according to claim 1, wherein said light emitter and said light receptor are formed on one substrate.

3. The optical device of claim 1, wherein the light emitter comprises horizontal resonator type laser, and a reflector facing an end face of the laser.

4. The optical device of claim 3, wherein the light emitter and the light receptor are formed on one substrate.

5. An optical device, comprising:

a laser which emits a light beam and which has a mirror which reflects the light beam from the laser onto an optical recording medium, both the laser and the mirror being formed on a substrate;

a photodiode receptor which receives light reflected from the optical recording medium; and a lens which focuses the light from the mirror onto the optical recording medium and which focuses the light reflected from the optical recording medium onto the photodiode receptor, wherein the light reflected from the optical recording medium is received by the photodiode receptor as undivided light, and wherein the photodiode receptor is divided into at least two portions, each of which detects receipt of the light reflected from the optical recording medium, the receptor comparing the light received by the at least two portions to detect a signal.

6. An optical device according to claim 5, wherein said laser and said receptor are formed on one substrate.

* * * * *